(12) United States Patent
Filippi et al.

(10) Patent No.: US 7,204,301 B2
(45) Date of Patent: Apr. 17, 2007

(54) MULTISERVICE HEAT EXCHANGE UNIT

(75) Inventors: Ermanno Filippi, Castagnola (CH);
Enrico Rizzi, Casnate con Bernate (IT);
Mirco Tarozzo, Ligornetto (CH)

(73) Assignee: Methanol Casale S.A. (CH)

( * ) Notice: Subject to any disclaimer, the term of this patent is extended or adjusted under 35 U.S.C. 154(b) by 0 days.

(21) Appl. No.: 10/517,553

(22) PCT Filed: Jun. 4, 2003

(86) PCT No.: PCT/EP03/05840

§ 371 (c)(1),
(2), (4) Date: Dec. 8, 2004

(87) PCT Pub. No.: WO2004/003452

PCT Pub. Date: Jan. 8, 2004

(65) Prior Publication Data

US 2005/0252645 A1   Nov. 17, 2005

(30) Foreign Application Priority Data

Jun. 28, 2002   (EP) ................................. 02014422

(51) Int. Cl.
*F28D 7/00*   (2006.01)

(52) U.S. Cl. ...................................... 165/157; 165/170
(58) Field of Classification Search ................ 165/157, 165/159, 169, 170
See application file for complete search history.

(56) References Cited

U.S. PATENT DOCUMENTS

| 3,666,423 | A  | 5/1972  | Muenger       |
| 3,895,676 | A  | 7/1975  | Young         |
| 5,035,867 | A  | 7/1991  | Dang Vu et al.|
| 6,460,614 | B1 | 10/2002 | Hamert et al. |

FOREIGN PATENT DOCUMENTS

| DE | 100 31 347 A1 | 1/2001  |
| EP | 1 153 653 A1  | 11/2001 |
| FR | 784 885 A     | 7/1935  |
| JP | 01088099 A    | 4/1989  |

*Primary Examiner*—Teresa J. Walberg
(74) *Attorney, Agent, or Firm*—Akerman Senterfitt

(57) ABSTRACT

Heat exchange unit of the so-called multiservice type comprising a substantially cylindrical shell closed at the opposite ends by respective base plates, a plurality of heat exchangers supported inside this shell and in fluid communication with the outside thereof.

15 Claims, 11 Drawing Sheets

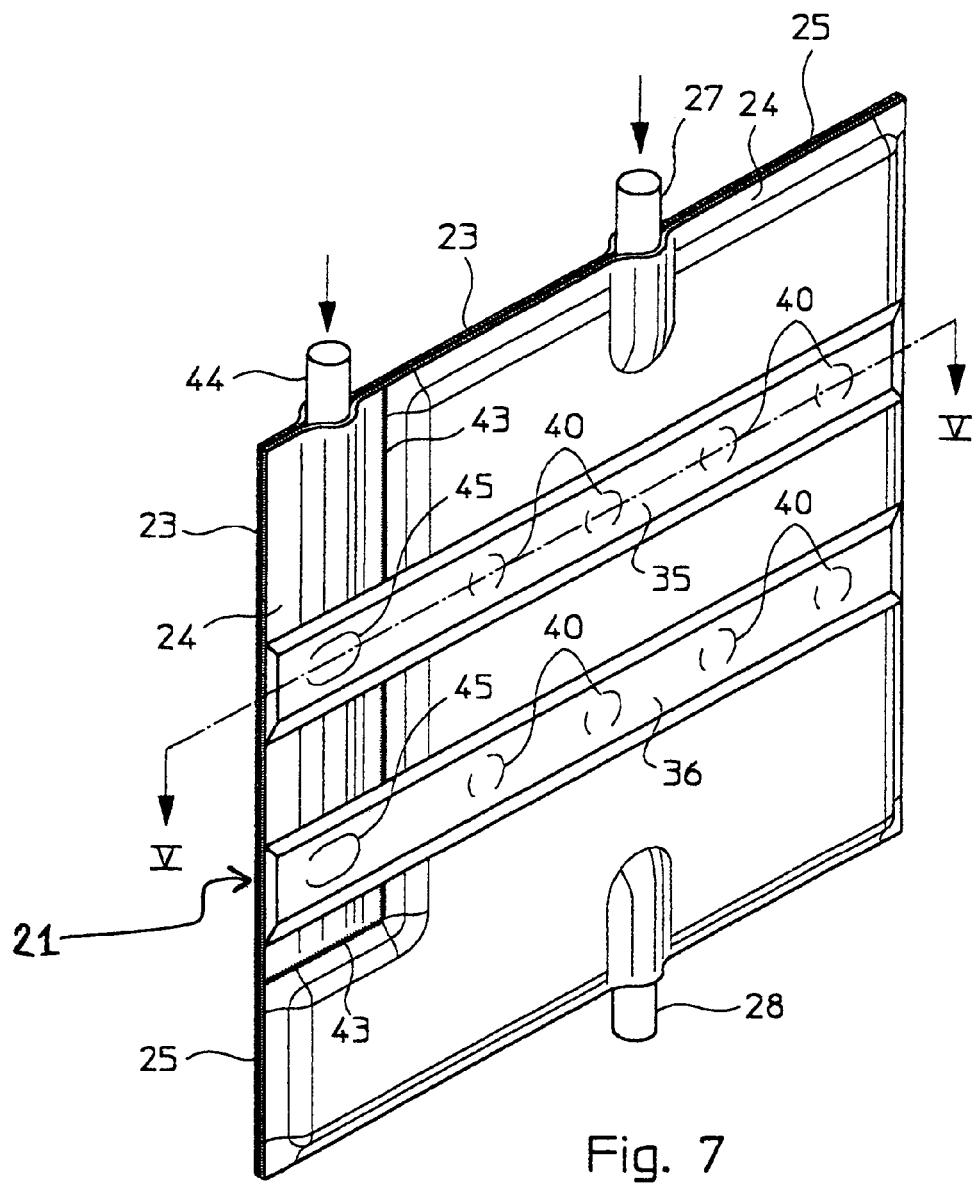
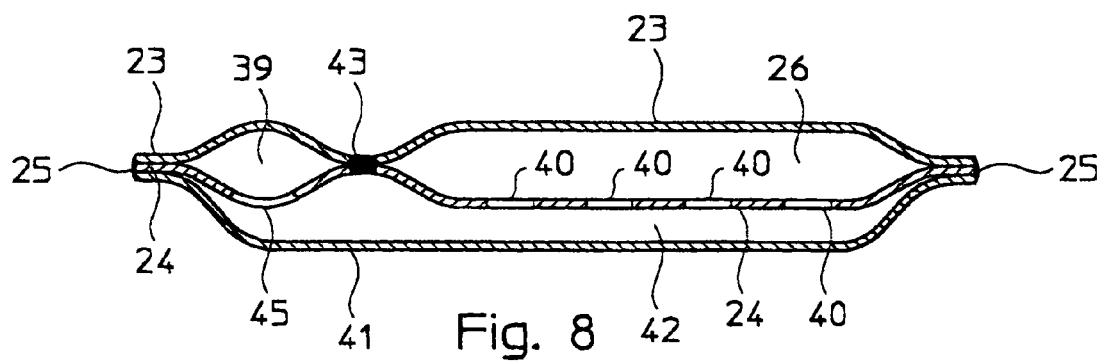
Fig. 7
Fig. 8

MULTISERVICE HEAT EXCHANGE UNIT

FIELD OF APPLICATION

In its most general aspect the present invention refers to a heat exchange unit of the so-called multiservice type, in other words a multipurpose unit capable of offering, in the plant where it is used, a plurality of different services, for example boiler, preheater of boiler water, water cooler.

In particular, the invention refers to a heat exchange unit of the so-called multiservice type comprising a substantially cylindrical shell closed at the opposite ends by respective base plates, a plurality of heat exchangers supported inside this shell and in fluid communication with the outside thereof.

PRIOR ART

The requirement to have available inside a chemical plant, for example for ammonia production, a unit capable of offering services like, for example, boiler, preheater of boiler water, water cooler, etc., is well known.

This requirement has frequently been satisfied up to now through so-called "multiservice" units, based upon the heat exchange between many fluids available in the considered plant and comprising a plurality of heat exchangers, generally one for each "service" intended to be offered or to be owned at disposal. Each heat exchanger, in turn, is of the type essentially comprising a cylindrical shell, closed at the opposite ends by respective base plates, and a tube bundle for the heat exchange, supported inside said shell and in fluid communication with the outside thereof.

This involves several drawbacks like a substantial investment in particular due to the high cost of each shell, a considerable encumbrance, difficulty of control and high maintenance costs.

Precisely to overcome the economic drawbacks linked in particular and recognisedly to the realisation of the cylindrical shell, it has been suggested to structure the multiservice units providing for a single shell, containing the predetermined total number of tube bundle heat exchangers inside, one for each service, each being in communication with the outside.

This has meant an enormous shell having a large economic impact upon the construction and the operating conditions of the plant. Indeed, so as to be able to house a plurality of tube bundle heat exchangers in said shell, large sized constructive elements, particularly complex and expensive to make are necessary.

Moreover, the assembly of these tube bundles inside said shell has complex problems of constructive realisation as far as the connection of such elements is concerned. All of this can also be cause of a bad distribution of the temperature inside said tube bundles to the detriment of the heat exchange efficiency.

SUMMARY OF THE INVENTION

The technical problem that is meant to be solved with the present invention is that of providing a multiservice heat exchange unit, having structural characteristics that overcome the drawbacks of the prior art, that is small size, high efficiency, ease of control, reduced maintenance costs.

Such a technical problem is solved, according to the invention, by a multiservice heat exchange unit comprising a substantially cylindrical shell closed at the opposite ends by respective base plates, a plurality of heat exchangers supported inside this shell and in fluid communication with the outside thereof, characterised in that at least a part of said plurality of exchangers consists of box-shaped plate exchangers, formed from a pair of juxtaposed metallic plates which are mutually distanced and perimetrically joined, to define an inner chamber intended to be crossed by at least one heat exchange fluid.

One or more of said plate exchangers contributes to the supply of one of the predetermined services provided by the multiservice heat exchange unit of the present invention.

Advantageously, said plate exchangers have a flattened configuration and are grouped in a cylindrical arrangement coaxial with the shell, where they are supported in a radial arrangement.

The main advantage of a multiservice unit according to the invention consists in combining different heat exchange services inside a single shell of a size strictly correlating with the size of the plurality of plate exchangers, with the consequent saving in investment for the realisation, easy operating and maintenance as regards the techniques of the prior art.

Moreover, the efficiency of the exchanger is also improved since the plates allow to obtain, compared to the tubes, a greater heat exchange surface.

According to a preferred embodiment, said shell contains an inert filler which neither chemically nor physically interacts with the operating fluid, into the bulk of which said plate exchangers are immersed. Thanks to the presence of said filler, the operating fluid is forced to carry out a winding movement inside the multiservice unit, allowing, on one side, a better contact between said operating fluid and said exchangers, and on the other side, a better mixing and therefore a better evenness of temperature inside the fluid itself. In this way there is an increase in the heat exchange coefficient of the multiservice unit, thus increasing the performance.

Further characteristics and advantages of the invention shall become clearer from the detailed description of an indicative and non-limiting example of embodiment of a multiservice heat exchange unit according to the invention, given hereafter with reference to the attached drawings.

BRIEF DESCRIPTION OF THE DRAWINGS

FIGS. 4 to 14 show respective variants of embodiment of a plate heat exchanger used in the multiservice unit of the present invention.

DETAILED DESCRIPTION OF THE FIGURES

Figure 1:
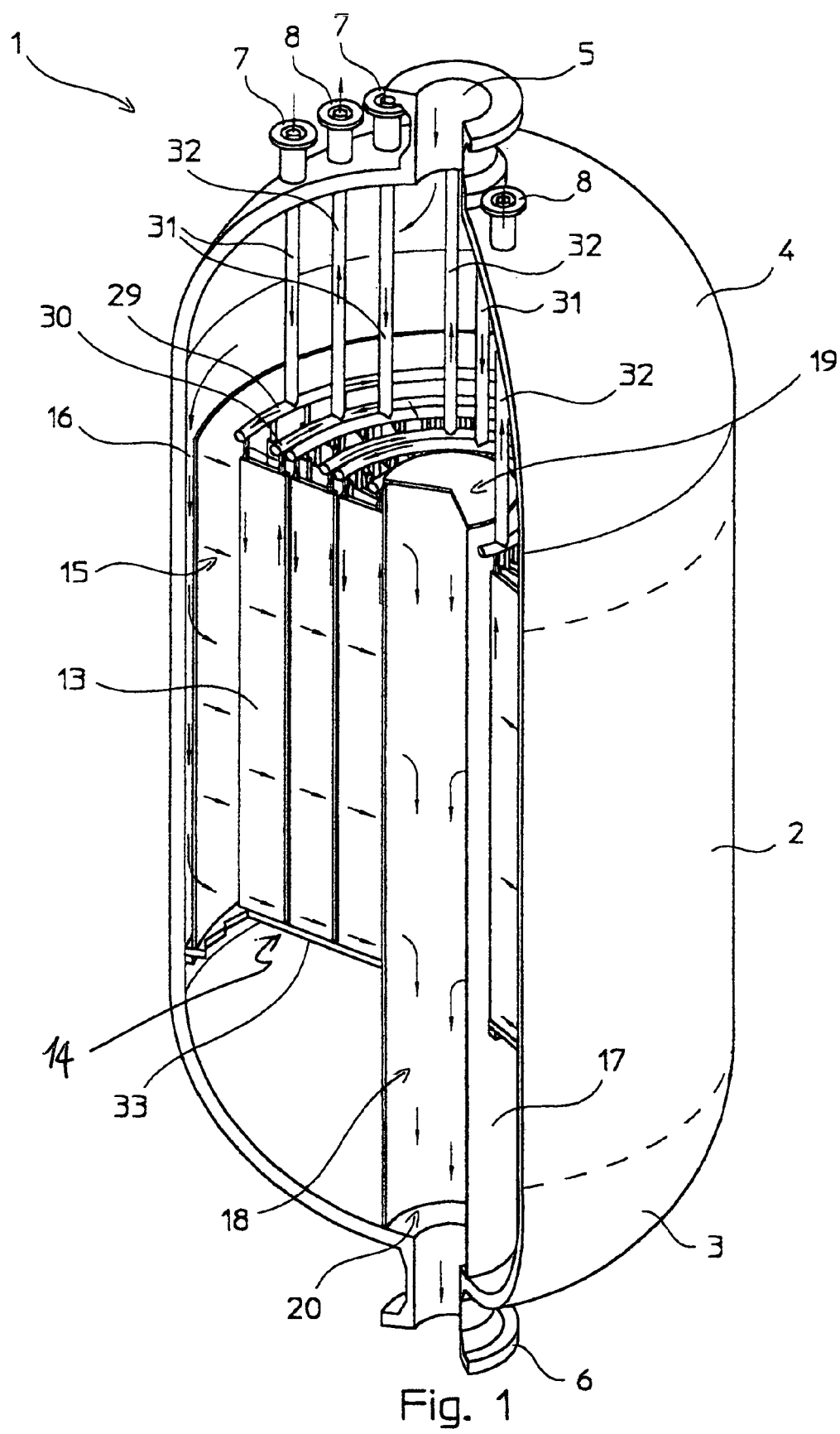
FIG. 1 shows a schematically a heat exchange unit according to the present invention.

With reference to FIG. 1, a multiservice heat exchange unit according to the invention is globally indicated with 1, comprising a cylindrical shell 2, with vertical axis, closed at the opposite ends by respective base plates, lower 3 and upper 4, a plurality of heat exchangers 13 supported inside the cylindrical shell 2 and in fluid communication with the outside thereof.

Figure 3:
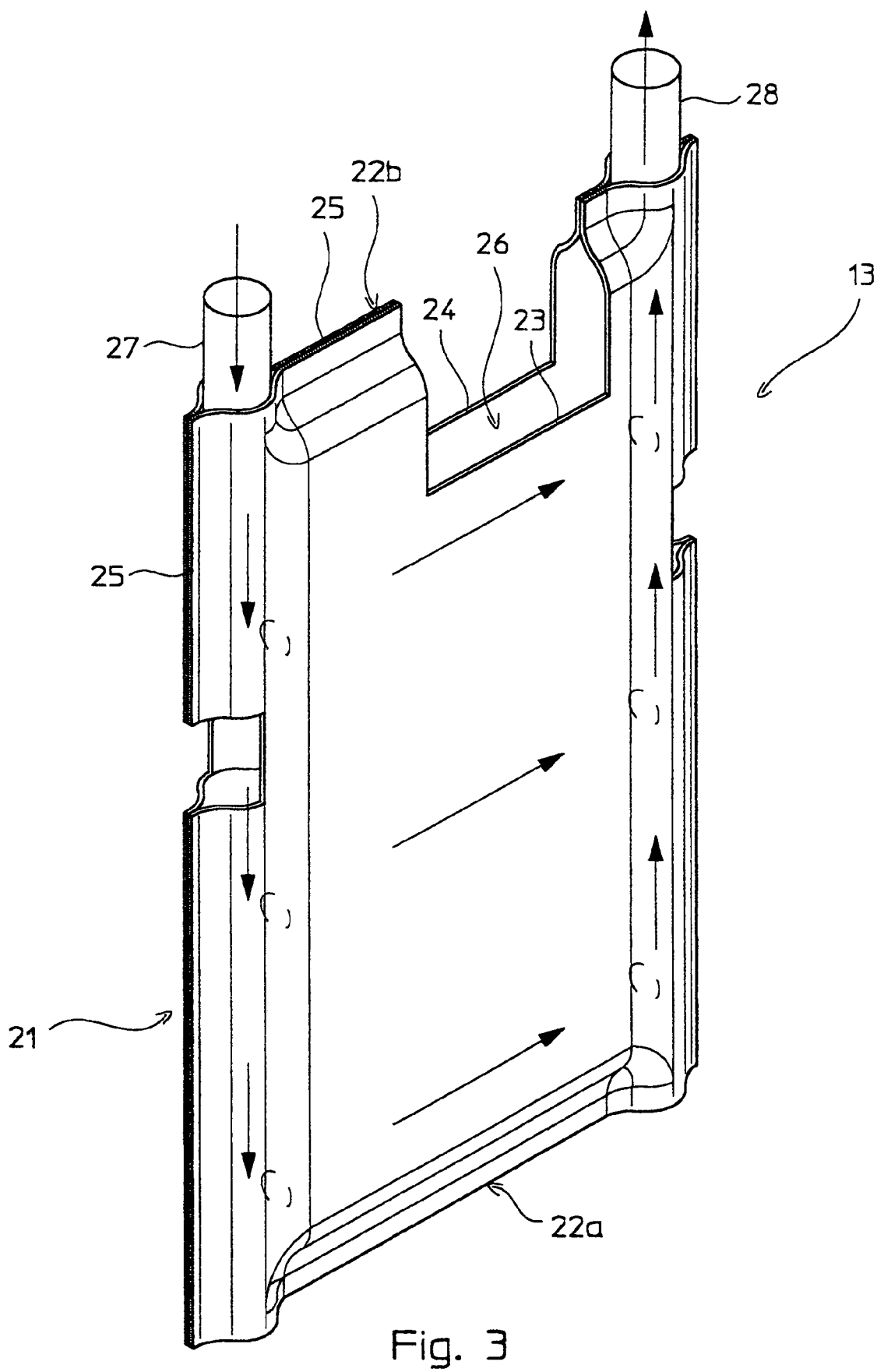
FIG. 3 shows perspectically on enlarged scale a heat exchanger of the heat exchange unit of FIG. 1.
Figure 3A:
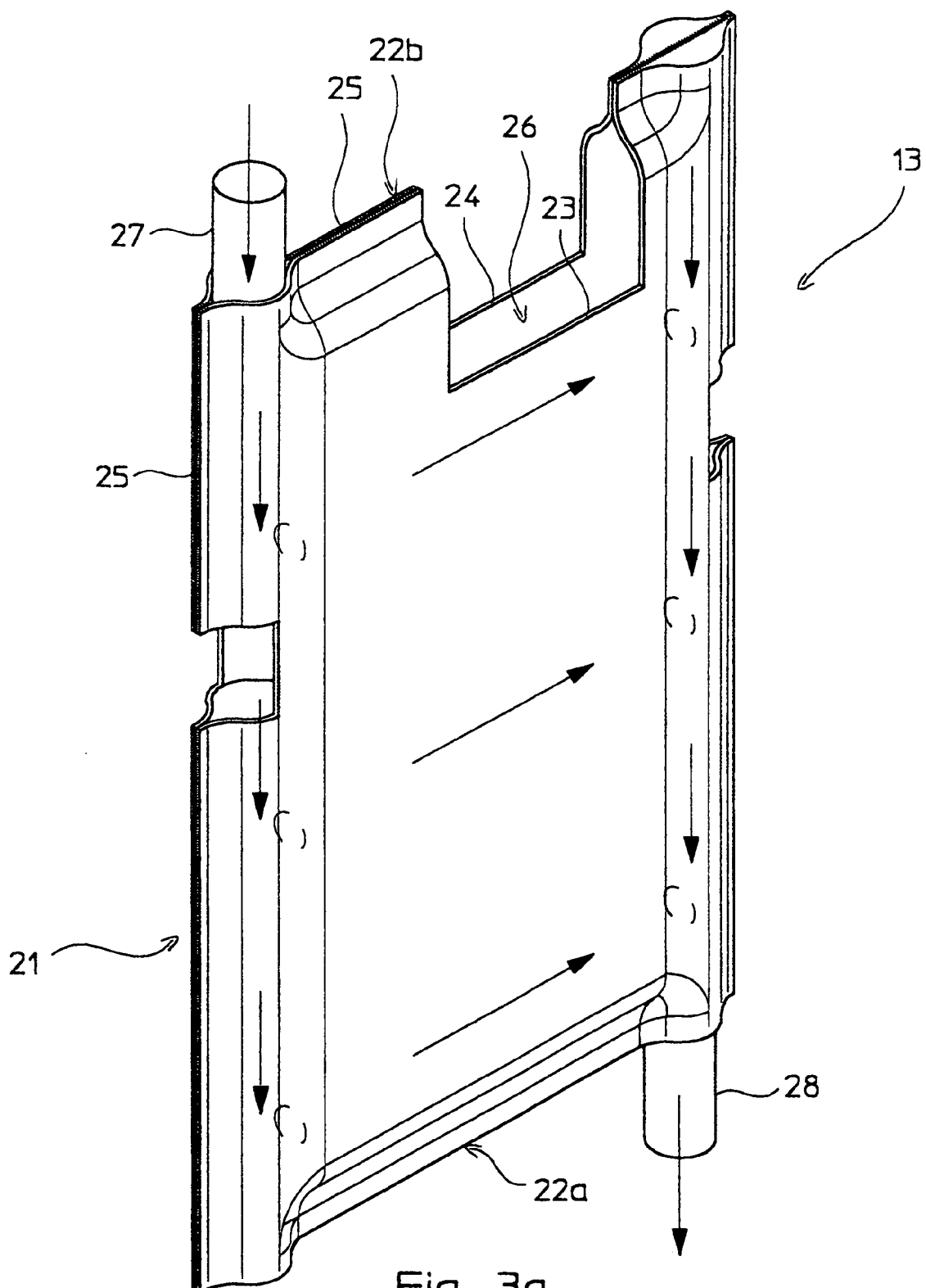

In accordance with the present invention, the aforementioned plurality of heat exchangers 13 consists of box-shaped plate exchangers, with an essentially flattened elongated rectangle configuration, in which two opposite long sides 21 and two opposite short sides 22a, 22b are emphasized (FIGS. 3 and 3a).

More specifically (FIGS. 3 and 3a), each heat exchanger 13 consists of a pair of juxtaposed metallic plates 23, 24, mutually distanced, perimetrically joined thanks to weldings 25 to define an inner chamber 26.

In accordance with a characteristic of the present invention, said plate exchangers 13 are also equipped with an inlet connector 27 and outlet connector 28 for a heat exchange operating fluid, which can both be positioned in correspondence with the same side, as represented in FIG. 3, on the short side 22b, or on different sides, as represented in FIG. 3a, on the sides 22a and 22b.

The lower and upper base plates 3, 4 are respectively equipped with an entry passage 5 and exit passage 6 for an operating fluid which flows inside the reactor on the shell side. Said upper base plate 4 is also conventionally equipped with a plurality of passages 7 for the input and a plurality of passages 8 for the discharge, respectively, of the operating heat exchange fluids which internally cross the plate exchangers 13, into and from said multiservice unit 1.

In the shell 2 a heat exchange zone (or environment) is defined, in which a substantially cylindrical shaped basket 14, with an annular cross section is conventionally supported; said basket 14 essentially consists of an outer cylindrical wall 15, defining with said shell 2 a reduced width interspace 16, an inner cylindrical wall 17 and a lower annular base plate 33.

The inner wall 17 centrally defines an axial passage, in which is generally supported a duct 18 for collecting the operating fluid which flows through the heat exchange unit on the side of the shell, which has a closed upper end 19 and open lower end 20 and is in direct fluid communication with the passage 6 of the base plate 3.

Said outer and inner walls 15 and 17 are perforated to allow the passage of the operating fluid on the shell side from the interspace 16 to the inside of said basket 14, and from said basket 14 to said central duct 18.

Inside said basket 14, the plate exchangers 13 are substantially arranged radially, with long sides 21 parallel to the axis of said multiservice unit 1 (and therefore to the axis of the shell 2), and short sides 22 extending radially and, preferably, are arranged to form, in the example of FIG. 1, pluralities of sets of three radial plate exchangers 13.

More specifically, the plate exchangers 13, which are supported, in a per se known manner, inside the basket 14, are placed, in the example of FIG. 1, on three coaxial and concentric arrangements, regularly distributed in a cylindrical annular configuration, having an outer diameter substantially equal to the outer diameter of the basket 14 and axially crossed by a passage having a diameter substantially equal to the inner diameter of the basket itself.

Figure 2:
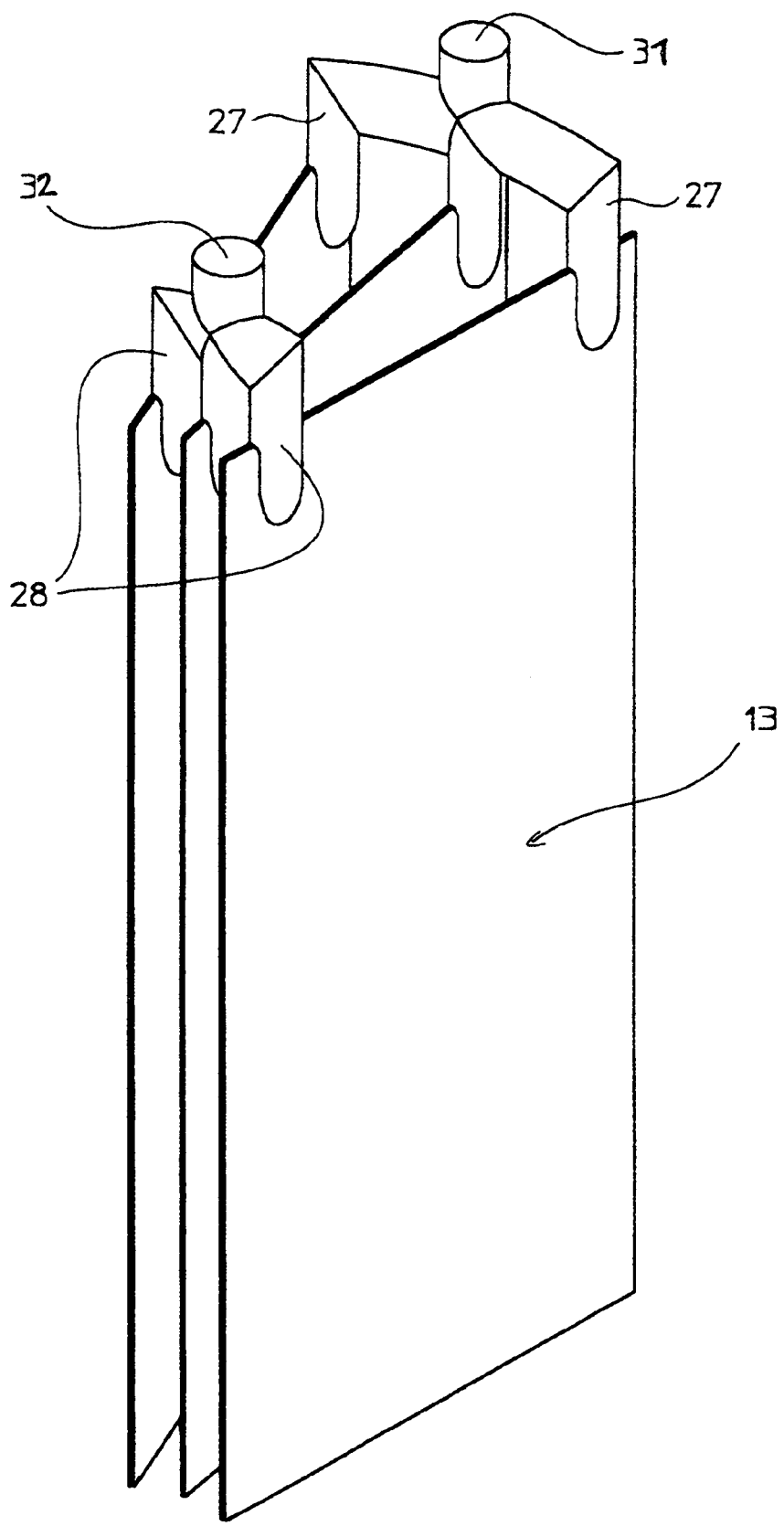
FIG. 2 shows perspectically on enlarged scale a detail of the heat exchange unit of FIG. 1.

According to a preferred embodiment of the present invention, a group of a predetermined number of plate exchangers 13 shares an inlet collector duct and an outlet collector duct (FIG. 2). This group of exchangers defines and is responsible for one of the realised services of the multiservice unit of the present invention. Preferably, but not limiting, said group of plate exchangers 13 defining a service comprises all the exchangers of the same coaxial and concentric arrangement. In particular, according to this preferred embodiment, each of the three coaxial and concentric arrangements of heat exchangers 13 constitutes one of the services realised by the multiservice unit of the present invention.

Said inlet and outlet connectors 27, 28 of the plate exchangers 13 are connected at the top with annular distributor and collector ducts, 29 and 30 respectively, of the operating fluid, arranged in correspondence with the upper end of the basket 14 and in a position lying over the cylindrical annular configuration of the plate exchangers 13. Each annular distributor duct 29 is connected to a single coaxial arrangement of plate exchangers 13; the same goes for each annular collector duct 30.

The aforementioned annular ducts 29 and 30 are also in fluid communication with the outside of the heat exchange unit 1, through respective ducts 31 for feeding and 32 for discharging said fluid, in turn respectively connected to one of the input passages 7 and to one of the discharge passages 8 for said heat exchange operating fluids.

Thanks to the configuration described above, in particular thanks to the use of plate exchangers 13, an optimisation of the heat exchange between the operating fluid on the shell side and the operating fluids flowing inside the plate exchangers 13 is obtained. Moreover, the problem of the use of many operating fluids is solved in a simple, cost-effective and easy to carry out way.

According to a preferred embodiment, the basket 14 is intended to contain a mass of an appropriate filler, for example marbles of inert solid material (not represented), in which the plate exchangers 13 are immersed and supported. Such a solution allows to further increase the overall heat exchange coefficient of the heat exchange unit according to the present invention.

According to a preferred embodiment, an operating fluid, entering through the passage 5 and coming out from the passage 6, crosses the exchanger on the shell side, coming into contact with the outside of the plate exchangers 13. The remaining three operating fluids enter through the passages 7 and are distributed separately, through the feed ducts 31 which extend from the aforementioned passages 7 the annular distributor ducts 29 and the distributor connectors 27, each inside a different coaxial concentric arrangement of plate exchangers 13. At the outlet of said plate exchangers 13, the aforementioned three operating fluids cross the collector connectors 28, enter inside the respective annular collector ducts 30, to be transported, through the outlet ducts 32, to the respective discharge passages 8.

Moreover, to obtain optimal heat exchange efficiency between the operating fluid on the shell side and the operating fluids flowing inside the plate exchangers 13, the operating fluid on the shell side should cross the heat exchange unit in a substantially radial direction.

This is advantageously obtained thanks to the passage of the operating fluid on the shell side through an interspace 16, from which, through the perforated wall 15 outside of the basket, said operating fluid will enter into said basket, flowing in a radial direction through the concentric and coaxial arrangements of plate exchangers 13. From here, through the perforated wall 17 inside the basket, said operating fluid shall come out from said basket, to enter into the central duct 18, which leads to the outlet passage 6.

This allows said operating fluid to exchange heat, along its path inside the heat exchange unit, in sequence with the operating fluids inside the plate exchangers 13, in such a way allowing a heat exchange with a uniform gradient starting from the outer cylindrical wall 15 of the basket, through the different concentric rows of plate exchangers 13 up to the central collector duct 18. Said operating fluid on the shell side can, if necessary, also carry out the aforementioned path in the opposite direction from the central duct to the cylindrical wall 15.

It should be noted that the shell 2 considered above can be designed ex novo or else can consist of a recovered shell.

The plate exchangers can be constructed according to different configurations which allow their heat exchange to be optimised in various ways.

Figure 4:
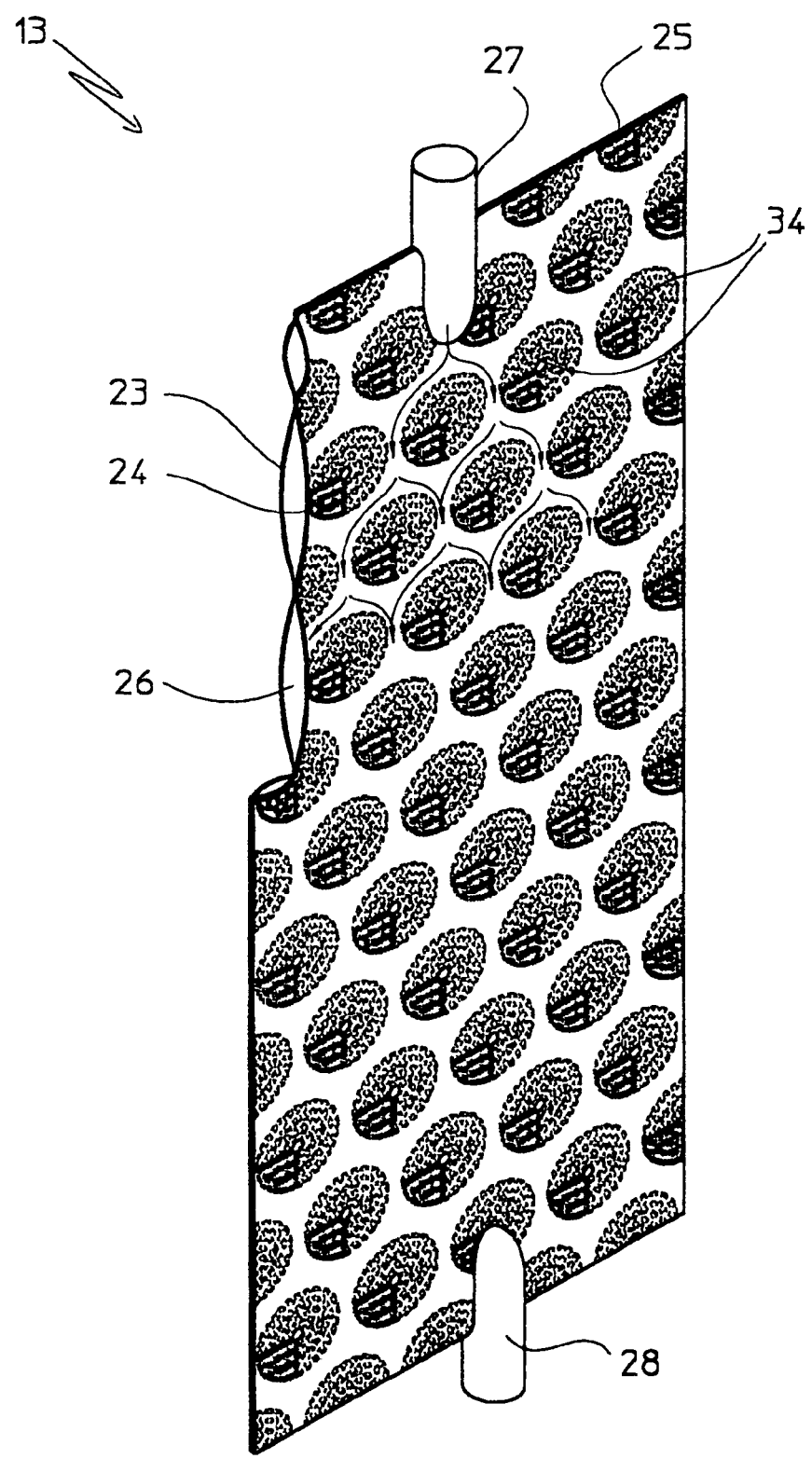

According to an embodiment (FIG. 4) the plates 23 and 24 are joined together also through a plurality of welding points, generally distributed in a regular manner, preferably according to an arrangement so called "quinconce" and/or in square pitch, which give the exchanger 13 a substantially "quilted" look.

The arrangement of the points 34 in an exchanger 13 can also be irregular, for example concentrated in some zones and totally absent in others.

It should be noted that, due to the presence of the aforementioned welding points 34, the passage of said fluid through the interspace 26 of a heat exchanger of the present invention takes place along winding paths, all in fluid communication with each other and with respective connectors 27 and 28, paths that can continually and randomly change. Thanks to such a distribution of the operating fluid inside the exchangers 13, an optimal distribution of the fluid inside the exchangers themselves 13 is obtained, with a substantial contribution to their heat exchange efficiency.

Figure 5:
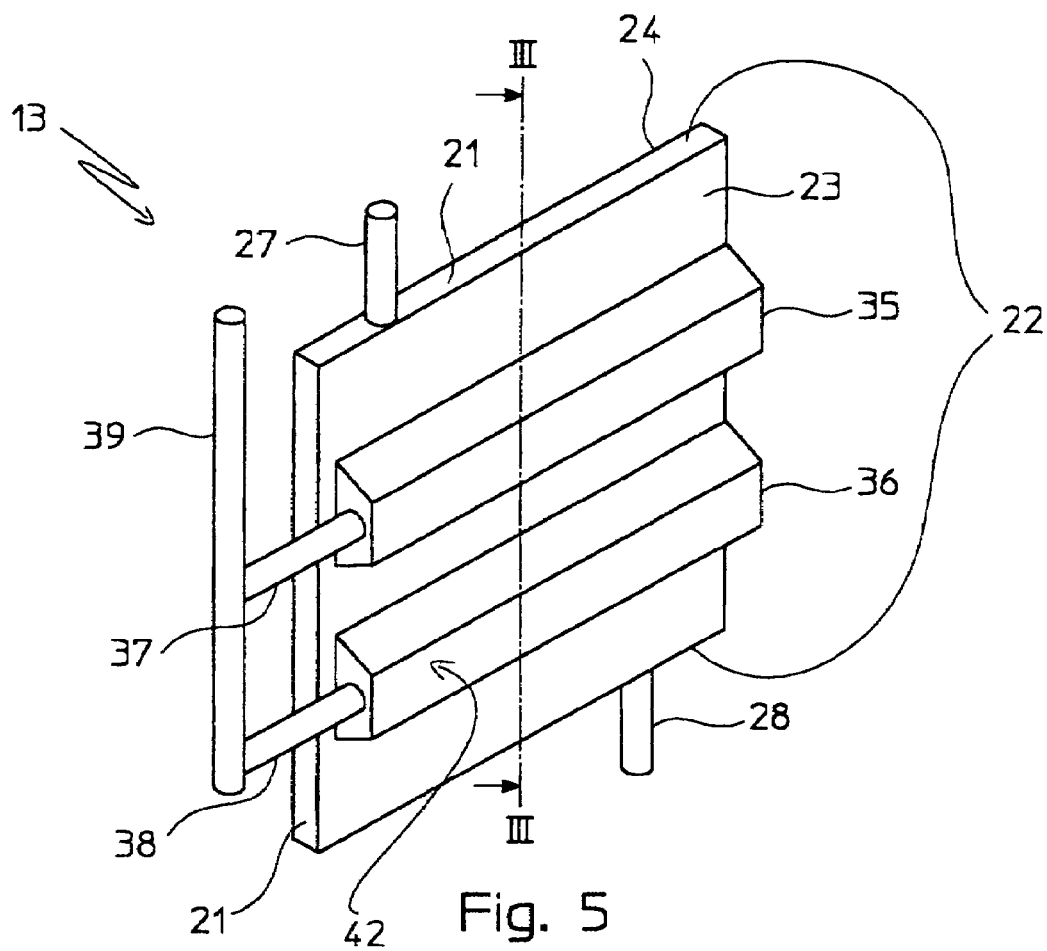

A further embodiment (FIG. 5) consists in fixing, to one of said walls of the exchanger 13, for example to the wall 23, and in predetermined intermediate positions with respect to the two opposite short sides 22, two (or more, or else even just one) identical distributors 35, 36, extending parallel to each other at respective precalculated distances from the connectors 27 and 28 for the entry and exit of the fluid.

Said distributors 35 and 36, which are in mutually distanced relationship, are connected on one side with said chamber 26 of the exchanger 13 and, on the other side, with a duct 39 through respective fittings 37, 38.

Figure 6:
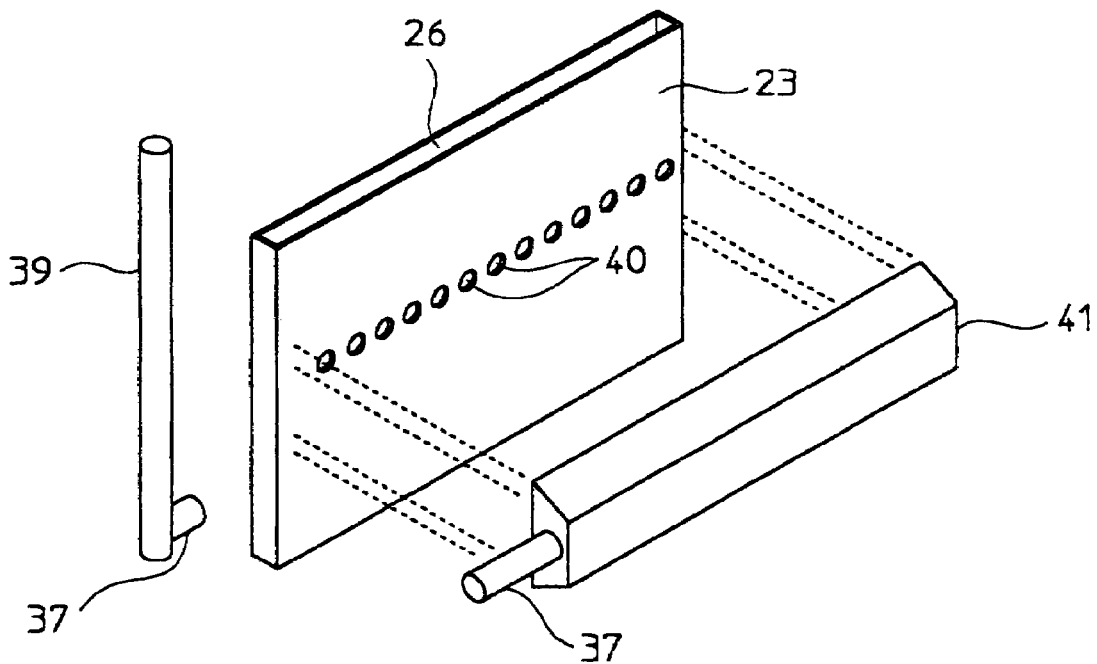

Essentially (FIG. 6) each distributor 35, 36 comprises a plurality of through-holes 40, formed in said wall 23 and arranged regularly in at least one generally rectilinear alignment, extending longitudinally to the distributor (35, 36) itself and a carter 41 essentially forming a channelling which, when fixed to said wall 23 covering said plurality of holes 40, forms a chamber 42 with it.

Thanks to the present invention, it is possible to control the temperature of the heat exchange operating fluid within a predetermined range of values, during its path through a heat exchanger 13.

With reference to FIGS. 7 and 8 and in accordance with a preferred embodiment of the heat exchanger 13 of the previous embodiment, the duct for supplying the second flow of operating fluid is defined in the same structure of the exchanger.

In particular, the heat exchanger 13 comprises two metallic plates 23, 24, of reduced thickness so as to be plastically deformable, joined together in substantial juxtaposition through a perimetric welding 25, carried out already providing, in correspondence with opposite sides 23, of said sheets, for the presence of connectors 27 and 28, for the entry and exit, respectively, of an operating fluid.

Said plates 23, 24 are also connected to each other by a substantially L-shaped welding line 43, extending parallel to a long side 21 of the exchanger 13, without connectors for the entry or exit of a fluid and at a reduced distance from it. In the short side 22 of the exchanger 13, and in correspondence with said welding 43, a third fitting 44 is provided, for the entry of a second flow of operating fluid.

Through plastic deformation of said plates 23, 24, obtained for example through injection of a pressurised gas between them, in the exchanger 13 are formed a chamber 26, intended to be crossed by a heat exchange operating fluid and a duct 39 for supplying said second flow of operating fluid, extending in correspondence with the zone between said L-shaped welding line 43 and the side 21 of the exchanger itself.

It should be noted that the supply duct 39, formed between the walls 23, 24 of the exchanger 13, is totally separated from the chamber 26, through the welding 43 itself which also guarantees the fluid seal.

On a plate, for example on the plate 23 of the exchanger 13, are fixed two or more distributors 35, 36, which are structurally and functionally totally similar to the distributors 35, 36 described above with reference to FIGS. 5–6. These distributors 35, 36 are in fluid communication with both the chamber 26, through a plurality of holes 40, formed in the plate being considered, and with the supply duct 39, through respective openings 45, provided in appropriate positions thereof.

The present embodiment allows the temperature of an operating heat exchange fluid circulating inside the exchangers 13 to be controlled within a very tight range of values around a predetermined value, if not actually allowing the temperature of said fluid to be kept substantially constant whilst it is crossing the respective exchanger 13.

Figure 9:
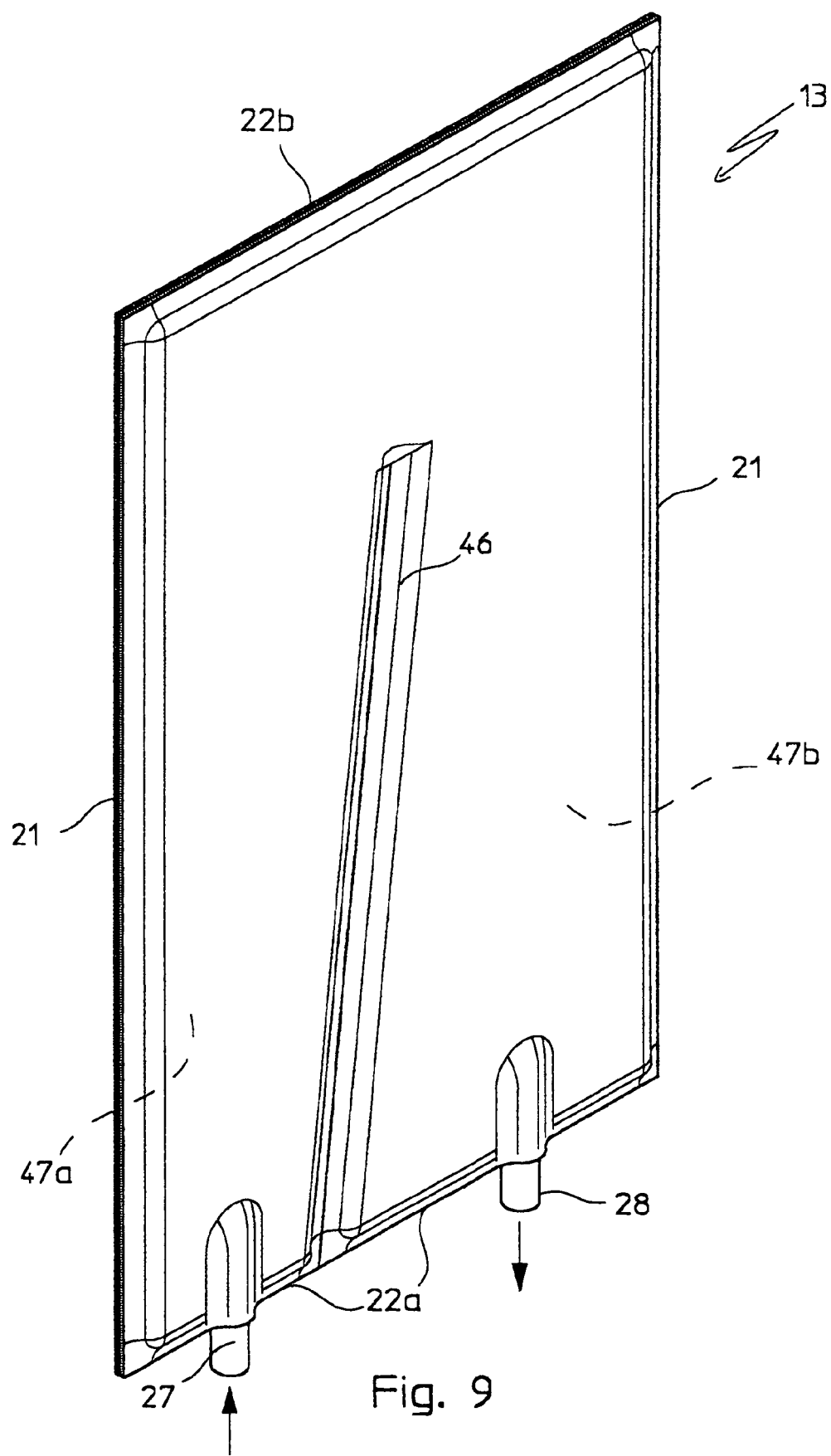
Figure 10:
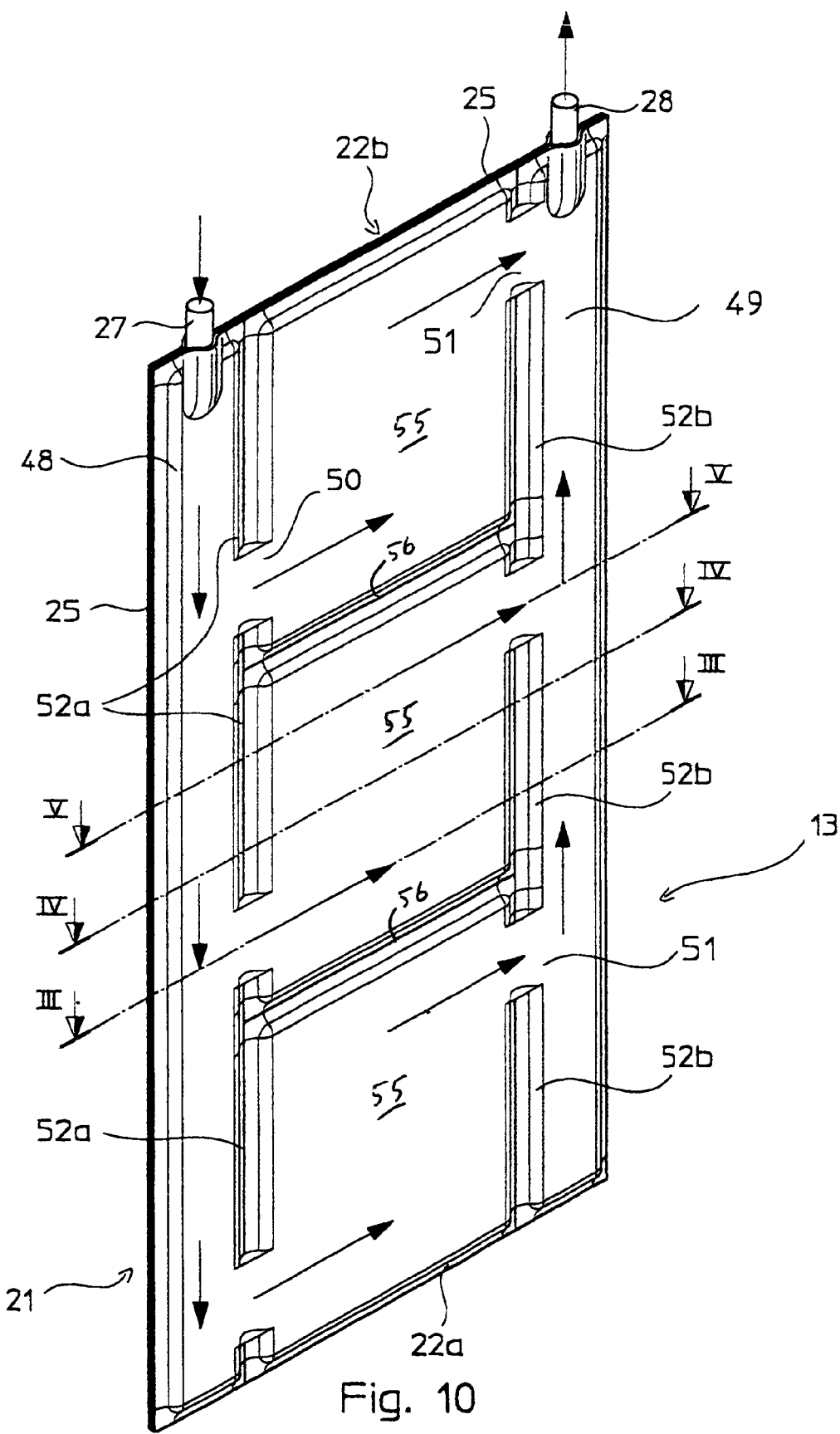
Figure 11:
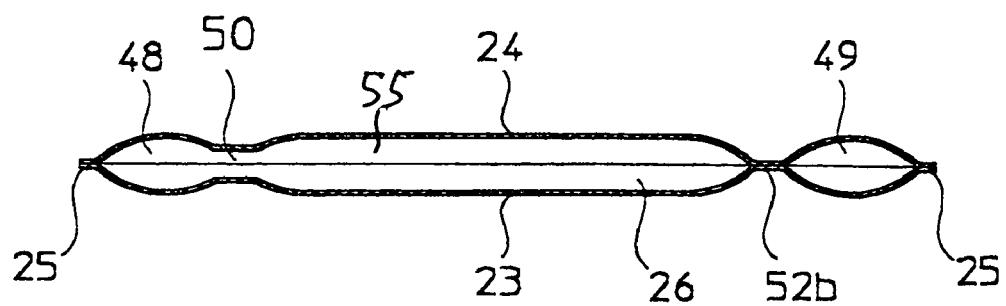
Figure 12:
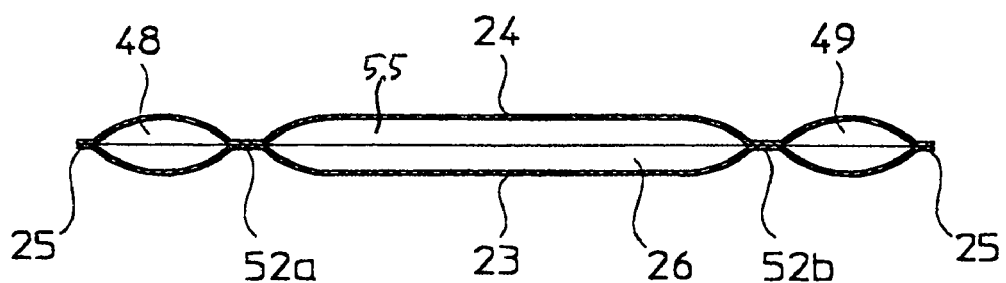
Figure 13:
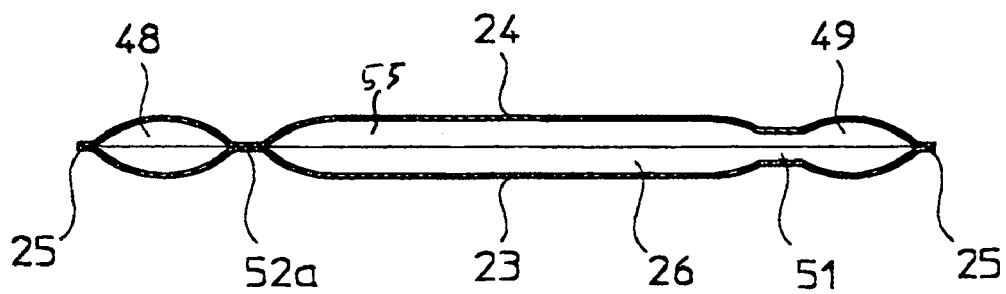

In accordance with a further advantageous characteristic of the present invention (FIG. 9), inside each exchanger 13 a separator plate 46 is provided for, extending from a short side 22 thereof and having a predetermined length shorter than that of the long sides 21, with respect to which it has a predetermined inclination.

Preferably, the separator plate 46 is obtained through mutual welding of the two plates 23, 24 which form said exchanger 13, starting from a suitable position of one of their short sides 22a extending towards the opposite short side 22b, as to which it is in a predetermined distanced relationship, so as to be equidistant from the two opposite long sides 21 at its end point.

Due to the presence of said separator plate 46, the chamber 26 of each exchanger 13 is subdivided into two contiguous parts 47a, 47b in communication with each other only near to the short side 22b, opposite to the short side 22a, from which the plate itself extends.

In accordance with another characteristic of the present invention, each of the two contiguous parts 47a, 47b of the inner chamber 26 of each exchanger is in communication with the outside through a respective tubular connector 27, 28, foreseen in said exchanger 13, in correspondence with the short side 22a thereof, from which the separator plate 46 overhangs.

With the present configuration, thanks to the inclined separator plate 46, the fluid proceeds along a path with a gradually increasing cross-section; this allows, when the operating fluid in question must undergo an expansion caused by the temperature, the speed of said operating fluid to be kept constant, balancing the expansion with a greater volume available to the fluid.

According to an alternative embodiment of the present invention (FIGS. 10 to 13), each exchanger 13 is equipped, in correspondence with the opposite long sides 21, with a distribution duct 48 and respectively a collector duct 49 of said operating fluid. The ducts 48 and 49 are, on one side, in fluid communication with said chamber 26 through at least one, but preferably a plurality of openings or holes 50 and 51, with which they are equipped along one or more generatrices and, on the other side, with the outside of the exchanger 13, through respective connectors 27 and 28 for the entry and exit of said operating fluid.

According to a preferred embodiment of the present variant, said ducts 48 and 49 are "formed" directly in the long sides 21 of the exchanger 13, at the time of the drawing and perimetric welding of the metallic plates 23 and 24 which constitute it. Advantageously, they are obtained through welding lines 52a, 52b, extending parallel to the long sides 21, at a predetermined distance from the perimetric weldings 25, whereas the openings 50, 51 for the passage of fluid are obtained through appropriate interruptions of such weldings 52a, 52b.

Moreover, according to this alternative embodiment, the inner chamber of each exchanger 13 is subdivided into a plurality of chambers 55, not directly communicating with each other and obtained, for example, through a corresponding plurality of welding lines 56 of the metallic plates 23, 24, extending parallel to the short sides 22 of the exchanger 13, in other words perpendicular to the distributor and collector ducts 48, 49 thereof. Each chamber 55 is in fluid communication with said distributor duct 48, through at least one opening 50 thereof and with said collector duct 49, through at least one opening 51 thereof.

This alternative configuration allows the flow of the operating fluid, within the exchangers 13, to be directed in the intended direction, for example and in particular in the radial direction with respect to the axis of the reactor, with the consequent improved heat exchange efficiency.

Figure 14:
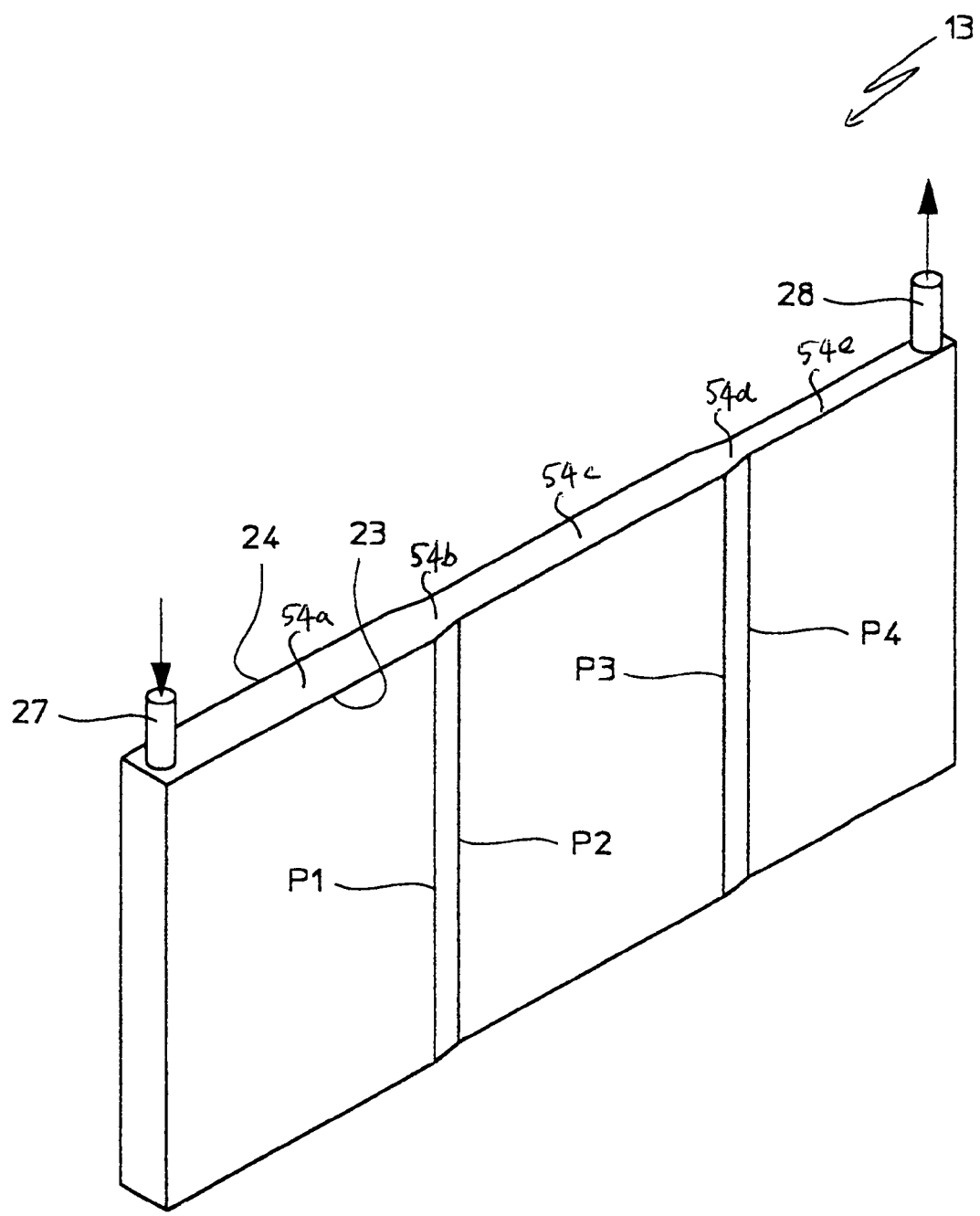

In accordance with the present invention, said chamber 26 of said exchanger 13 may have, as represented in FIG. 14, a variable size along the direction parallel to the line of the inlet connectors, i.e. the distance between the plates 23, 24 increases or decreases along said direction, so as to advantageously obtain a variation in speed of the operating fluid in the flow direction of the operating fluid itself.

According to a preferred embodiment, in the inner chamber 26 three zones 54a, 54c, 54e following each other in the aforementioned flow direction of the operating fluid are defined, each of the three having a constant size but different as regards the other two zones. More specifically, said size shall be at its maximum in the zone 54a, at its minimum in the zone 54e and intermediate between these two at 54c. Said zones 54a, 54c, 54e communicate with each other through connector zones 54b, 54d converging in said flow direction. Preferably, said connector zones 54b, 54d are defined by appropriate pairs of folding lines (P1 and P2, respectively, on the left and on the right of the zone 54b; P3 and P4, respectively, on the left and on the right of the zone 54d) realised in the opposite plates.

This embodiment allows, in a simple manner from the constructive point of view, to keep substantially constant the heat exchange capacity (thanks to the reduction in the passage section thereof) and the efficiency of the heat exchangers 13, following the variation in density of the operating fluid inside the plate, with the consequent variation in speed which is thus kept preferably constant.

The invention thus conceived is susceptible to further variants and modifications all of which are within the capabilities of the man skilled in the art and, as such, fall within the scope of protection of the invention itself, as defined by the following claims.

The invention claimed is:

1. A heat exchange unit of the multiservice type comprising:
   a substantially cylindrical shell closed at the opposite ends by respective base plates;
   a plurality of heat exchangers supported inside this shell and in fluid communication with the outside thereof;
   wherein at least some of said exchangers are box-shaped plate exchangers formed from a pair of juxtaposed metallic plates mutually distanced and perimetrically joined, to define an inner chamber intended to be crossed by a heat exchange fluid,
   wherein a group of a predetermined number of said plate exchangers share an inlet and an outlet so that said group of said plate exchangers defines and supplies one of the predetermined services provided by the multiservice heat exchange unit, and
   wherein different heat exchange services are combined inside said shell.

2. Heat exchange unit according to claim 1, wherein said plate exchangers have a flattened configuration and are grouped in a cylindrical arrangement coaxial to the shell, where said plate exchangers are arranged according to a radial configuration.

3. Heat exchange unit according to claim 2, wherein said plate heat exchangers are supported in a plurality of coaxial and concentric arrangements and a group of plate exchangers comprises all the exchangers of a same coaxial and concentric arrangement.

4. Heat exchange unit according to claim 1, wherein said substantially cylindrical shell is filled with a filler in which said plurality of plate exchangers is immersed.

5. Heat exchange unit according to claim 1, wherein said metallic plates of at least one plate exchanger are joined together through a plurality of welding points which give a substantially quilted look.

6. Heat exchange unit according to claim 5, wherein said welding points are distributed in 'quinconce' and/or in square pitch.

7. Heat exchange unit according to claim 1, wherein said heat exchangers 13 have a substantially rectangular flattened configuration, with opposite long sides parallel to the axis of the shell, and opposite short sides arranged radially inside said shell and equipped on opposite short sides with connectors for the entry and exit of fluid.

8. Heat exchange unit according to claim 7, wherein at least one distributor is fixed to a wall of at least one exchanger in a predetermined intermediate position as regards the two opposite short sides, connected, on one side, with said chamber of said exchanger and, on the other side, with a duct for feeding fluid.

9. Heat exchange unit according to claim 8, wherein said distributor comprises a carter essentially forming a channelling which, when fixed to said metallic plate of said at least one exchanger, forms with it a chamber in communication with the inside of the exchanger through a plurality of through-holes.

10. Heat exchange unit according to claim 8, wherein said plate exchangers define an inner chamber of variable size growing in the direction of the imaginary line joining the connectors.

11. Heat exchange unit according to claim 8, wherein said plate exchangers define an inner chamber of variable size decreasing in the direction of the imaginary line joining the connectors.

12. Heat exchange unit according to claim 1, wherein at least one of said exchangers is internally equipped with a separator plate, extending from one side of said exchanger, towards a side opposite it and from which said plate is in a predetermined spaced relationship, said separator plate having a predetermined length less than that of said long sides, as to which it has a predetermined inclination.

13. Heat exchange unit according to claim 1, wherein at least one of said exchangers is internally equipped in correspondence with the opposite long sides of at least one distributor/collector duct, said duct being connected, on one side, to said chamber through at least one opening and, on the other side, to the outside of the exchanger, through a connector.

14. Heat exchange unit according to claim 13, wherein said duct is formed directly in a long side of the exchanger.

15. Heat exchange unit according to claim 14, wherein said at least one exchanger is subdivided into a plurality of chambers.

* * * * *